Figure 1:
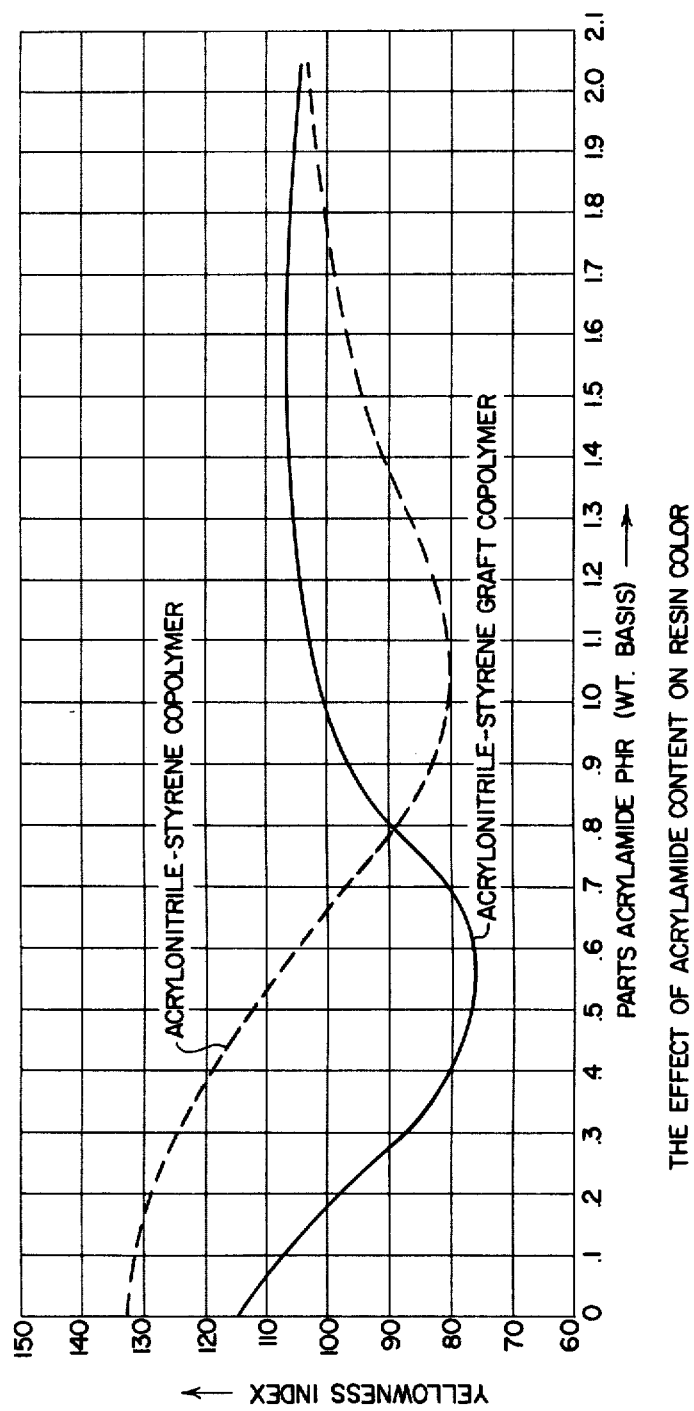
Figure 2:
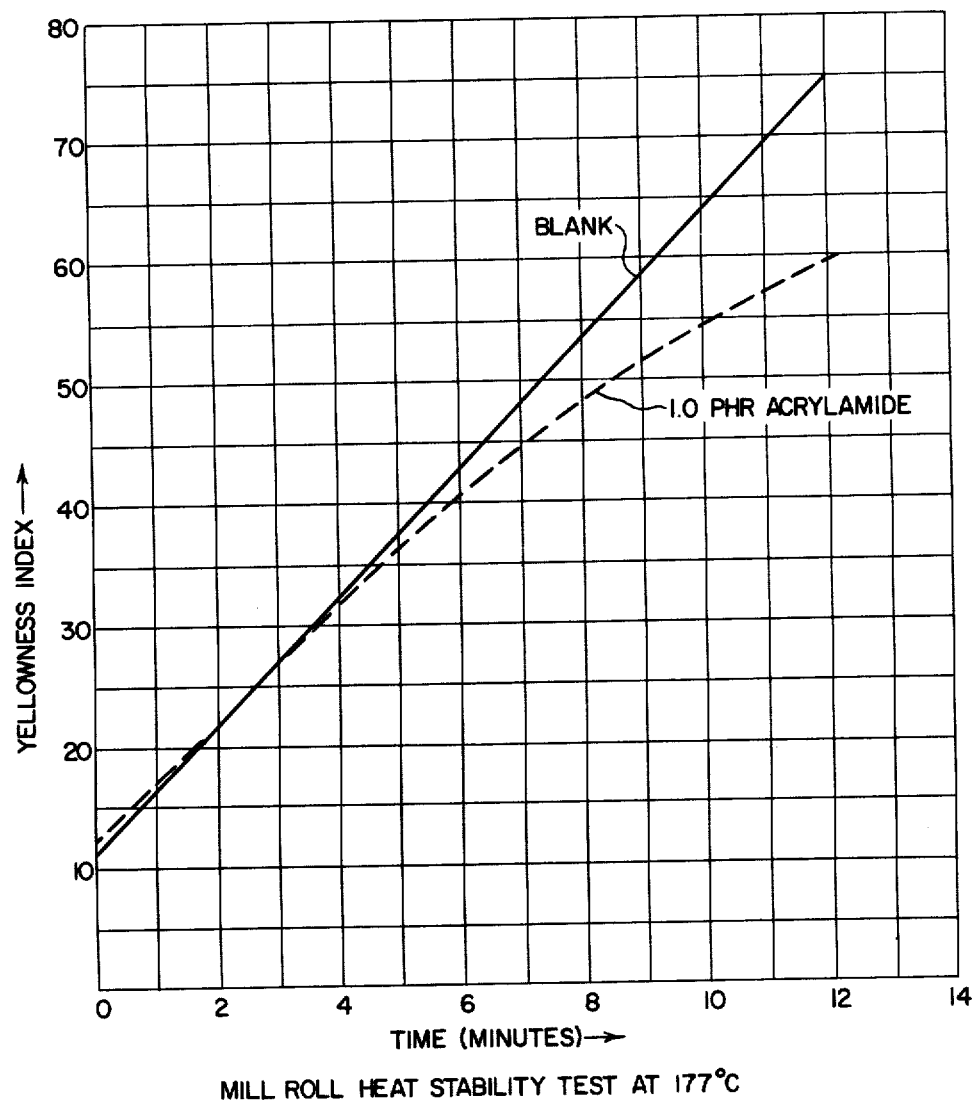

United States Patent [19]

Wardlow, Jr.

[11] B 3,925,305

[45] Dec. 9, 1975

[54] THERMALLY-STABLE HIGH NITRILE RESINS AND METHOD FOR PRODUCING THE SAME

[75] Inventor: Eddie Wardlow, Jr., Cleveland, Ohio

[73] Assignee: The Standard Oil Company, Cleveland, Ohio

[22] Filed: Aug. 8, 1973

[21] Appl. No.: 386,592

[44] Published under the Trial Voluntary Protest Program on January 28, 1975 as document no. B 386,592.

[52] U.S. Cl. ...... 260/45.9 NC; 260/45.9 R; 260/879
[51] Int. Cl.$^2$ ...................... C08K 5/20; C08L 51/06
[58] Field of Search ........ 260/45.9 R, 45.9 NC, 879

[56] References Cited

UNITED STATES PATENTS

| | | | |
|---|---|---|---|
| 3,313,867 | 4/1967 | Blackburn et al. | 260/45.9 NC |
| 3,314,914 | 4/1967 | Suling et al. | 260/45.9 NC |
| 3,399,161 | 8/1968 | Ichikawa et al. | 260/45.9 NC |

*Primary Examiner*—Joseph L. Schofer
*Assistant Examiner*—Maria S. Tungol
*Attorney, Agent, or Firm*—John F. Jones; Sherman J. Kemmer; Evelyn R. Kosman

[57] ABSTRACT

The present invention relates to a method for stabilizing nitrile resins against thermal discoloration by the inclusion of acrylamide in amounts of from 0.1 to 1.5 parts by weight per 100 parts of resin.

11 Claims, 2 Drawing Figures

MILL ROLL HEAT STABILITY TEST AT 177°C

THERMALLY-STABLE HIGH NITRILE RESINS AND METHOD FOR PRODUCING THE SAME

The present invention relates to a method for stabilizing nitrile resins against discoloration resulting from thermal degradation during processing. More particularly this invention relates to the stabilization of copolymers and graft copolymers containing a high proportionate amount of olefinic nitrile against thermal discoloration by the inclusion of minor amounts of acrylamide in the polymer.

It has been reported in *Faserforschung und Textiltechnik*, Vol. 21, No. 3, pp. 105–110 (1970) that maleic acid, maleimide and its N-substituted derivatives are useful as inhibitors for the thermal discoloration of polyacrylonitrile. However, the use of amides, and particularly acrylamide, for this purpose has heretofore not been disclosed. Acrylamide appears to be unique among amides in general for the stabilization of olefinic nitrile resins against thermal discoloration, since related amides, such as, methacrylamide, N-octylacrylamide, N,N-methylenebisacrylamide, urea and acetamide are found to be ineffective for this purpose.

Acrylamide is compatible with the nitrile resins of this invention, and it does not impart any haze or reduce light transmission of the resin, nor does it have any adverse effects on the physical properties of the resins within the concentration ranges specified. Additionally, the low cost of acrylamide and its ready availability make this compound an attractive inhibitor for nitrile resins.

Acrylamide can be advantageously incorporated into the resin by intimately mixing or blending granular acrylamide with the powdered resin. Improvement in color is observed by adding acrylamide in concentrations as low as about 0.1 part per hundred parts of resin, on a weight basis, and although no greater color improvement is obtained with concentrations beyond about 1.5 parts per hundred parts of resin (phr), there appears to be no adverse effect on the properties of the resin with higher concentrations. The greatest degree of color improvement, however, is obtained when employed in concentrations ranging from about 0.3 to about 1.2 parts phr.

The resins of this invention are composed of polymers of an olefinically unsaturated nitrile, another monomer component copolymerizable with said olefinically-unsaturated nitrile, and optionally a diene rubber.

The polymers are those produced by polymerizing a major proportion of a mono-unsaturated nitrile, such as acrylonitrile, and a minor proportion of another monovinyl monomer component copolymerizable with said nitrile, in an aqueous medium, preferably in the presence of a preformed diene rubber which may be a homopolymer or a copolymer of a conjugated diene monomer.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl butadiene-1,3, and the like, and others. Most preferred for the purpose of this invention are butadiene and isoprene because of their ready availability and their excellent copolymerization properties.

The olefinically-unsaturated nitriles useful in the present invention are the alpha, beta-olefinically unsaturated mononitriles having the structure

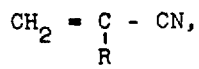

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile, and mixtures thereof.

The other monovinyl monomer component copolymerizable with the olefinically unsaturated nitriles which are useful in this invention includes one or more of the vinyl aromatic monomers, esters of olefinically unsaturated carboxylic acids, vinyl esters, vinyl ethers, alpha-olefins and others.

The vinyl aromatic monomers include styrene, alpha-methyl styrene, the vinyl toluenes, the vinyl xylenes, and the like. Most preferred is styrene.

The esters of olefinically unsaturated carboxylic acids include those having the structure

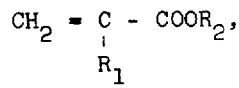

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

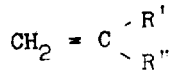

wherein R' and R" are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

Polymers of particular utility in this invention and details of their method of preparation are described in patent application Ser. No. 62,655 filed Aug. 10, 1970 and in U.S. Pat. Nos. 3,426,102 and 3,586,737.

The polymers useful in this invention are those prepared by the polymerization of 100 parts by weight of (A) at least 50% by weight of at least one nitrile having the structure

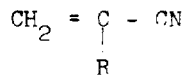

wherein R has the foregoing designation and (B) up to 50% by weight based on the combined weight of (A) and (B) of at least one member selected from the group consisting of (1) styrene, (2) an ester having the structure

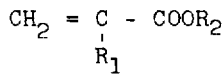

wherein $R_1$ and $R_2$ have the foregoing respective designations, (3) an alpha-olefin having the structure

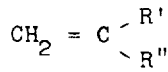

wherein R' and R'' have the foregoing respective designations, (4) a vinyl ether selected from the group consisting of methyl vinyl ether, ethyl vinyl ether, the propyl vinyl ethers, and the butyl vinyl ethers, and (5) vinyl acetate, in the presence of from 0 to 40 parts by weight of (C) a rubbery polymer of a conjugated diene monomer selected from the group consisting of butadiene and isoprene and optionally a comonomer selected from the group consisting of styrene and a nitrile monomer having the structure

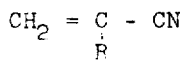

wherein R has the foregoing designation, said rubbery polymer containing from 50 to 100% by weight of polymerized conjugated diene and from 0 to 50% by weight of comonomer.

Preferably, component (A) should be present in from about 60 to 90% by weight based on the combined weight of (A) and (B) and the rubbery polymer (C) should contain more than 50% by weight of conjugated diene and more preferably from 60 to 90% by weight of the conjugated diene.

The polymers useful in this invention can contain compounding ingredients and additives, pigments, colorants, stabilizers, etc., as is well known in the art so long as the balance between impact strength, flexural strength, tensile strength, processability, heat distortion temperature, and the like, are not affected to such a degree that the article is no longer useful for its intended purpose.

Polymeric products of the present invention are thermoplastic materials which can be thermoformed into a wide variety of useful articles in any of the conventional ways employed with known thermoplastic polymeric materials, such as by extrusion, milling, molding, drawing, blowing, and the like. These polymers have excellent solvent resistance and their impact strength and low permeability to gases and vapors make them very useful in the packaging industry, and they are particularly useful in the manufacture of bottles, film, and other types of containers for liquids and solids.

The following examples will further illustrate the present invention in greater detail, however, it is to be understood that the scope of this invention is not to be limited by these examples.

EXAMPLE 1

Acrylonitrile-Styrene Copolymer

A. A polymer was prepared by polymerizing with continuous agitation at 70°C, in the substantial absence of oxygen, a mixture of the following ingredients:

|  | Parts by weight |
| --- | --- |
| Acrylonitrile | 96.0 |
| Styrene | 29.0 |
| Pentaerythritol Tetrakis (mercaptopropionate) | 2.0 |
| Azo-bis-isobutyronitrile | 0.1 |
| Sodium dodecyl benzene sulfonate | 1.5 |
| Water | 250.0 |

The styrene was added continuously to the reaction mixture over a period of 2 hours. The polymer was isolated from the mixture by coagulation in methanol with dilute aqueous aluminum sulfate. The polymer was then filtered, dried and compression molded into a disc, 1¼ inch in diameter, at a temperature of 155°C and under a pressure of 4,000 psi. Yellowness index and percent light transmission were then determined on the molded disc.

Yellowness index was determined by the ASTM Standard Method D 1925-70, using a Hunter Color Difference Meter, Model No. D25 D2P. The percent light transmission was determined by the ASTM Standard Method D 1003-61 using the same color meter.

Acrylamide-Stabilized Acrylonitrile-Styrene

B. A portion of the acrylonitrile-styrene copolymer of Example 1 (A) was blended with 1.0 part by weight phr of granular acrylamide in a Brabender Plasticorder for 5 minutes at 230°C and 35 r.p.m. A disc was molded from the blend, as in Example 1, and the yellowness index and percent light transmission were determined by the above methods. Comparative results for Examples 1 (A) and 1 (B), shown in Table I below, indicate the effectiveness of acrylamide as a color stabilizer for acrylonitrile-styrene copolymers.

Table I

| Example | Yellowness Index | % Transmission |
| --- | --- | --- |
| 1 (A) | 128.0 | 58.3 |
| 1 (B) (average of 2) | 80.7 | 71.6 |

EXAMPLE 2

Acrylamide-Stabilized Acrylonitrile-Styrene Copolymer

The acrylonitrile-styrene copolymer resin preparation of Example 1 was repeated, and the resin was divided into seven samples to which were added varying amounts of acrylamide so that the concentrations in the samples ranged from 0 to 2.0 parts acrylamide phr. The samples were processed, and the molded discs were prepared in the same manner as in Example 1. The resulting yellowness index numbers were then plotted against the stabilizer content of the sample in FIG. 1.

EXAMPLE 3

Acrylamide-Stabilized Acrylonitrile-Styrene Graft Copolymer a. An elastomer was prepared by polymerizing with continuous agitation at 60°C in the substantial absence of oxygen, a mixture of the following ingredients:

|  | Parts by weight |
|---|---|
| Butadiene | 75.0 |
| Styrene | 25.0 |
| P & G Soap Flakes | 2.25 |
| t-Dodecyl Mercaptan | 0.7 |
| Sodium salts of polymerized alkyl naphthalene sulfonic acids (Daxad-11) | 0.1 |
| Potassium Persulfate | 0.2 |
| Water | 200.0 |

The polymerization was carried out for 15 hours to a conversion of about 97.7% and a total solids of about 33.3%.

b. An impact-resistant, gas barrier graft copolymer was prepared by polymerizing a mixture of the following ingredients:

|  | Parts by weight |
|---|---|
| Acrylonitrile | 9.4/67.5 |
| Styrene | 0.6/22.5 |
| Elastomer solids (obtained from (a) | 42.8 |
| Alkylphenoxy-poly(ethyleneoxy)ethyl ester of phosphoric acid (GAFAC RE-610, emulsifier) | 1.25 |
| Pentaerythritol tetrakis (mercaptopropionate) (chain transfer agent) | 1.9 |
| Citric Acid | 0.2 |
| Azo-bis-isobutyronitrile (initiator) | 0.05/0.05 |
| Water | 260 |

In the preparation of the resin, the emulsifier (GAFAC RE-610) and citric acid were dissolved in water and charged to the reactor. To this were added the elastomer, azo-bis-isobutyronitrile, 9.4 parts of acrylonitrile and 0.6 parts of styrene with stirring. The reactor was purged with nitrogen and the temperature was raised to 65°C. Fifteen minutes after this temperature was reached the addition of a solution of 67.5 parts of acrylonitrile, 22.5 parts of styrene and 1.9 parts of the chain transfer agent was begun and was continued over a period of 4½ hours. The reaction was continued for 15 minutes longer, after pumping of the monomer feed ceased, and the reactor was cooled and stripped for two hours under vacuum.

The resin was isolated from the latex by coagulation from methanol with dilute aqueous aluminum sulfate, and the polymer was then washed and dried. The resin was divided into seven samples to which were added granular acrylamide stabilizer in amounts varying from 0 to 2.0 parts phr. The samples were each blended in the Brabender Plasticorder and molded into discs, as in Example 1, and yellowness indices were determined on each of the seven samples.

The yellowness indices for these samples were plotted versus the percent concentration of acrylamide stabilizer in the resins in the graph shown in FIG. I. The correlations in this figure show that maximum stabilization against thermal discoloration for acrylonitrile-styrene resins for both copolymers and graft copolymers occurs at concentrations of between about 0.3 to 1.2 parts of acrylamide phr.

EXAMPLE 4

Acrylamide-Stabilized Acrylonitrile-Methyl Acrylate Graft Copolymer a. an elastomer was prepared by reacting the following ingredients for 9 hours at 53°C in a nitrogen atmosphere:

|  | Parts by weight |
|---|---|
| Butadiene | 70 |
| Acrylonitrile | 30 |
| t-Dodecyl Mercaptan | 0.71 |
| P & G Soap Flakes | 1.4 |
| Azo-bis-isobutyronitrile | 0.4 |
| Ethylene diamine tetraacetic acid (Versene) | 0.05 |
| Sodium salts of polymerized alkyl naphthalene sulfonic acids (Daxad-11) | 0.1 |
| Antifoaming agent (Dow FG-10) | <0.04 |
| Water | 200 |

The final pH of the reaction mixture was 9.5 and the total solids after completion of the reaction was 30.0%.

b. A graft resin was prepared utilizing the above elastomer by reacting the following components at 57°C over a period of 3.1 hours.

|  | Parts by weight |
|---|---|
| Acrylonitrile | 75 |
| Methyl acrylate | 25 |
| Elastomer solids (obtained from (a) above) | 9 |
| Sodium salt of dioctyl sulfosuccinate | 1.21 |
| Polyvinylpyrrolidone | 0.3 |
| Pentaerythritol tetrakis (mercaptopropionate) (chain transfer agent) | 1.55 |
| Potassium persulfate | 0.06 |
| Antifoam (Dow FG-10) | <.04 |
| Water | 230 |

All of the above materials were added initially to the reactor with agitation with the exception of the chain transfer agent, which was added 20 minutes after the start of the reaction. Completion of the reaction was determined on the basis of total solids of 28% and a conversion of 85%. The latex was coagulated in methanol with aqueous aluminum sulfate, filtered and dried.

Two fifty-gram samples of the dried resin Examples 4(A) and 4(B) were weighed out, and to Example 4(B) was added 0.5 grams (1.0 phr) of granular acrylamide. The acrylamide was blended into the resin by manually shaking in a closed container. Both samples were then further blended in a Brabender Plasticorder as hereinbefore described. A 1¼ inch disc was prepared from the fused Brabender melt of each resin, and yellowness index determinations were then run on the discs. Comparative results are shown in Table II below.

Table II

|  | Parts Acrylamide (phr) | Yellowness Index |
|---|---|---|
| Example 4(A) | 0 | 98.3 |
| Example 4(B) | 1.0 | 89.4 |

EXAMPLE 5

Acrylamide-Stabilized Acrylonitrile-Styrene Graft Copolymer a. An elastomer was prepared in the same manner as described in Example 3(a) by polymerizing the following ingredients at 60°C for 16 hours.

|  | Parts by weight |
|---|---|
| Butadiene | 75.0 |
| Styrene | 25.0 |
| P & G Soap Flakes | 2.25 |
| t-Dodecyl Mercaptan | 0.8 |
| Sodium salts of polymerized alkyl naphthalene sulfonic acids (Daxad-11) | 0.1 |
| Potassium persulfate | 0.15 |
| Water | 200.0 | b. The impact-resistant, gas barrier resin was prepared as in Example 3(b) by polymerizing the following mixture at 71°C for 5¼ hours.

|  | Parts by weight |
|---|---|
| Acrylonitrile | 9.6/67.5 |
| Styrene | 0.97/0.4/22.5 |
| Pentaerythritol tetrakis (mercaptopropionate) (chain transfer agent) | 0.02/0.2/1.6 |
| Alkylphenoxy-poly(ethyleneoxy)ethyl ester of phosphoric acid (GAFAC RE-610, emulsifier) | 1.25 |
| Elastomer solids (from (a) above) | 46.3 |
| Citric Acid | 0.2 |
| Azo-bis-isobutyronitrile (initiator) | 0.05 |
| Water | 250.0 |

In preparing the resin, the water and the emulsifier (GAFAC RE-610) were charged to the reactor, and the elastomer which had been previously stirred with 0.97 parts of styrene for 16 hours was filtered and added to the reactor along with the azo-bis-isobutyronitrile and 0.02 parts of the chain transfer agent. 9.6 Parts of acrylonitrile and 0.4 parts of styrene were then added with stirring. The reactor was purged with nitrogen, and the temperature of the reaction mixture was raised to 60°C. After a period of 15 minutes, a solution of 67.5 parts of acrylonitrile, 22.5 parts of styrene and 0.2 parts of chain transfer agent was pumped into the reactor over a period of 5 hours. The temperature was increased to 75°C by completion of the monomer addition. After 2⅓ hours of feed time, an additional 1.6 parts of chain transfer agent was added to the remaining monomer feed. The reaction was continued for 15 minutes after the feed was discontinued, and the reaction mixture was then cooled to 65°C and stripped under vacuum.

The graft copolymer was isolated and dried in the manner as previously described and was divided into two parts, samples 5(A) and 5(B). 1.0 Parts phr of granular acrylamide stabilizer was added to sample (5B), and the mixture was blended on the Brabender Plasticorder as before.

The two samples were then subjected to mill stability tests. In this test a 320-gram sample of resin was plasticized on a two-roll rubber mill at 177°C. The sample was then removed as soon as the material fused, and subsequent samples were removed at 2-minute intervals thereafter for a total of 12 minutes. The samples were then subjected to yellowness index measurements, and the index numbers were plotted versus time on the graph shown in FIG. II. The stability of the resin was then calculated from the slope of the line, the lower the slope, the greater the stability toward thermal discoloration. The slope for the resin without the acrylamide stabilizer was calculated to be 5.18, while that for the resin containing 1.0 part of acrylamide phr was 3.95, indicating greater stability for the latter resin.

I claim:

1. A polymer composition stable toward thermal discoloration containing from about 0.1 to 1.5 parts by weight of acrylamide per hundred parts of resin, wherein said polymer is composed of 100 parts by weight of:

A. at least 50% by weight of at least one nitrile having the structure

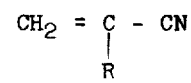

wherein R is hydrogen, a lower alkyl group having from 1 to 4 carbon atoms, or a halogen, and B. up to 50% by weight based on the combined weight of (A) and (B) of at least one member selected from the group consisting of:
  1. styrene,
  2. an ester having the structure

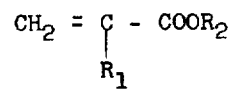

wherein $R_1$ is hydrogen, an alkyl group having from 1 to 4 carbon atoms, or a halogen, and $R_2$ is an alkyl group having from 1 to 6 carbon atoms,
  3. an alpha-olefin having the structure

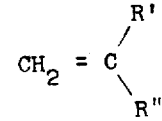

wherein R' and R'' are alkyl groups having from 1 to 7 carbon atoms,
  4. a vinyl ether selected from the group consisting of methyl vinyl ether, ethyl vinyl ether, the propyl vinyl ethers, and the butyl vinyl ethers, and
  5. vinyl acetate, and wherein said monomers are copolymerized in the presence of from 0 to 40 parts by weight of:

C. a rubbery polymer of a conjugated diene monomer selected from the group consisting of butadiene and isoprene and optionally a comonomer selected from the group consisting of styrene and a nitrile monomer having the structure

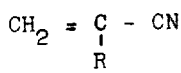

wherein R has the above designation, said rubbery polymer containing from 50 to 100% by weight of polymerized conjugated diene and from 0 to 50% by weight of comonomer.

2. The composition of claim 1 wherein the component (A) is present in amounts of from about 60 to 90% by weight based on the combined weight of (A) and (B); component (B) is correspondingly present in amounts of from about 40 to 10% by weight based on the combined weight of (A) and (B), and the acrylamide is present in concentrations of from about 0.3 to 1.2 parts by weight per hundred parts of resin.

3. The composition of claim 2 wherein the component (A) is a member selected from the group consisting of acrylonitrile and methacrylonitrile.

4. The composition of claim 3 wherein the component (B) is styrene.

5. The composition of claim 3 wherein component (B) is a member selected from the group consisting of methyl acrylate, ethyl acrylate, methyl methacrylate, and ethyl methacrylate.

6. A method for stabilizing a polymer composition against thermal discoloration during processing, comprising adding from about 0.1 to 1.5 parts by weight of acrylamide per hundred parts of a polymer produced by the polymerization of a major portion of an unsaturated nitrile and a minor portion of another vinyl monomer, and optionally said polymerization being carried out in the presence of a preformed diene rubber.

7. The method of claim 6 wherein the polymer is obtained by polymerizing 100 parts by weight of
    A. at least 50% by weight of at least one nitrile having the structure

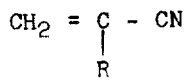

wherein R is hydrogen, a lower alkyl group having from 1 to 4 carbon atoms, or a halogen, and
    B. up to 50% by weight based on the combined weight of (A) and (B) of at least one member selected from the group consisting of
    1. styrene,
    2. an ester having the structure

wherein $R_1$ is hydrogen, an alkyl group having from 1 to 4 carbon atoms, or a halogen, and $R_2$ is an alkyl group having from 1 to 6 carbon atoms,
    3. an alpha-olefin having the structure

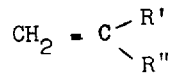

wherein R' and R'' are alkyl groups having from 1 to 7 carbon atoms,
    4. a vinyl ether selected from the group consisting of methyl vinyl ether, ethyl vinyl ether, the propyl vinyl ethers, and the butyl vinyl ethers,
    5. vinyl acetate, and
wherein said monomers are copolymerized in the presence of from 0 to 40 parts by weight of
    C. a rubbery polymer of a conjugated diene monomer selected from the group consisting of butadiene and isoprene and optionally a comonomer selected from the group consisting of styrene and a nitrile monomer having the structure

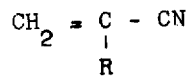

wherein R has the above designation, said rubbery polymer containing from 50 to 100% by weight of polymerized conjugated diene and from 0 to 50% by weight of comonomer.

8. The method of claim 7 wherein the polymer is obtained by polymerizing from about 60 to 90% by weight of component (A) based on the combined weight of (A) and (B) and correspondingly from about 40 to 10% by weight of component (B) based on the combined weight of (A) and (B); and wherein the acrylamide is included in said polymer composition in concentrations of from about 0.3 to 1.2 parts by weight per hundred parts of resin.

9. The method of claim 8 wherein component (A) is a member selected from the group consisting of acrylonitrile and methacrylonitrile.

10. The method of claim 9 wherein component (B) is styrene.

11. The method of claim 9 wherein component (B) is a member selected from the group consisting of methyl acrylate, ethyl acrylate, methyl methacrylate, and ethyl methacrylate.

* * * * *